US009587712B2

(12) United States Patent
Cho et al.

(10) Patent No.: US 9,587,712 B2
(45) Date of Patent: Mar. 7, 2017

(54) PLANETARY GEAR TRAIN OF AUTOMATIC TRANSMISSION FOR VEHICLES

(71) Applicant: Hyundai Motor Company, Seoul (KR)

(72) Inventors: Wonmin Cho, Hwaseong-si (KR); Jae Chang Kook, Hwaseong-si (KR); Myeong Hoon Noh, Seongnam-si (KR); Seongwook Ji, Ansan-si (KR); Kangsoo Seo, Yongin-si (KR); Seong Wook Hwang, Gunpo-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/927,216

(22) Filed: Oct. 29, 2015

(65) Prior Publication Data

US 2016/0333975 A1 Nov. 17, 2016

(30) Foreign Application Priority Data

May 13, 2015 (KR) ........................ 10-2015-0066908

(51) Int. Cl.
*F16H 3/62* (2006.01)
*F16H 3/66* (2006.01)

(52) U.S. Cl.
CPC ....... *F16H 3/66* (2013.01); *F16H 2200/0073* (2013.01); *F16H 2200/2012* (2013.01); *F16H 2200/2046* (2013.01)

(58) Field of Classification Search
None
See application file for complete search history.

(56) References Cited

U.S. PATENT DOCUMENTS

| 2016/0146298 A1* | 5/2016 | Cho | F16H 3/66 475/269 |
| 2016/0146304 A1* | 5/2016 | Ji | F16H 3/66 475/275 |
| 2016/0146305 A1* | 5/2016 | Cho | F16H 3/66 475/275 |
| 2016/0146306 A1* | 5/2016 | Cho | F16H 3/66 475/269 |

FOREIGN PATENT DOCUMENTS

| KR | 10-1317142 B1 | 10/2013 |
| KR | 10-2014-0046240 A | 4/2014 |
| KR | 10-1427977 B1 | 8/2014 |

* cited by examiner

*Primary Examiner* — Dirk Wright
(74) *Attorney, Agent, or Firm* — Morgan, Lewis & Bockius LLP

(57) ABSTRACT

A planetary gear train of an automatic transmission for vehicles may include an input shaft receiving power of an engine, an output shaft outputting shifted power of the engine, a first planetary gear set, a second planetary gear set, a third planetary gear set, a fourth planetary gear set, a first rotational shaft, a second rotational shaft, a third rotational shaft, a fourth rotational shaft selectively connected to the first rotational shaft and selectively connected to a transmission housing simultaneously, a fifth rotational shaft selectively connected to the first rotational shaft and directly connected to the input shaft simultaneously, a sixth rotational selectively connected to the transmission housing, a seventh rotational shaft selectively connected to the first and third rotational shafts, an eighth rotational shaft directly connected to the output shaft, and six frictional elements.

11 Claims, 2 Drawing Sheets

FIG. 2

|      | C1 | C2 | C3 | C4 | B1 | B2 |
|------|----|----|----|----|----|----|
| 1ST  | O  |    |    | O  |    | O  |
| 2ND  |    | O  |    | O  |    | O  |
| 3RD  | O  | O  |    |    |    | O  |
| 4TH  |    | O  |    |    | O  | O  |
| 5TH  |    | O  | O  |    |    | O  |
| 6TH  |    | O  | O  |    | O  |    |
| 7TH  | O  | O  | O  |    |    |    |
| 8TH  | O  |    | O  |    | O  |    |
| 9TH  |    |    | O  | O  | O  |    |
| 10TH | O  |    |    | O  | O  |    |
| 11TH |    | O  |    | O  | O  |    |
| REV  | O  |    | O  |    |    | O  |

PLANETARY GEAR TRAIN OF AUTOMATIC TRANSMISSION FOR VEHICLES

CROSS-REFERENCE TO RELATED APPLICATION

The present application claims priority to Korean Patent Application No. 10-2015-0066908 filed May 13, 2015, the entire contents of which is incorporated herein for all purposes by this reference.

BACKGROUND OF THE INVENTION

Field of the Invention

The present invention relates to an automatic transmission for vehicles, and more particularly, to a planetary gear train of an automatic transmission for vehicles capable of improving power transfer performance and reducing fuel costs by implementing advance 11-speeds by a minimum configuration.

Description of Related Art

Recently, increasing oil prices have caused vehicle manufacturers all over the world to rush into infinite competition. Particularly in the case of engines, manufacturers have been pursuing efforts to reduce the weight and improve fuel efficiency of vehicles by reducing engine size, etc.

As a result, in the case of an engine, research for reducing weight and improving fuel efficiency by down-sizing the engine has been conducted, and in the case of an automatic transmission, research of simultaneously securing drivability and fuel efficiency competitiveness through multiple speed stages of the automatic transmission has been conducted.

However, in the case of the automatic transmission, as the number of speed stages increases, the number of internal components also increases, and as a result, the automatic transmission may be difficult to mount, the manufacturing cost and weight may be increased, and power transmission efficiency may be deteriorated.

Thus, in order to increase an effect of improving the fuel efficiency by the multi-stage, it may be said that the development of a planetary gear train capable of maximizing efficiency with a small number of parts is important.

In this regard, 8-speed and 9-speed automatic transmissions have been recently implemented, and a research and development into a planetary gear train capable of implementing a shift stage of 8-speed or more has been actively conducted.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a planetary gear train of an automatic transmission for vehicles having advantages of improving power transfer performance and fuel costs by a multi-stage of a shift stage by implementing the shift stage of advance 11-speed and reverse 1-speed by a minimum configuration, and improving silence drivability of the vehicle by using a drive point in a low revolution per minute (RPM) region of an engine.

According to various aspects of the present invention, a planetary gear train of an automatic transmission for vehicles may include an input shaft receiving power of an engine, an output shaft outputting shifted power of the engine, a first planetary gear set having a first sun gear, a first planetary carrier, and a first ring gear, a second planetary gear set having a second sun gear, a second planetary carrier, and a second ring gear, a third planetary gear set having a third sun gear, a third planetary carrier, and a third ring gear, a fourth planetary gear set having a fourth sun gear, a fourth planetary carrier, and a fourth ring gear, a first rotational shaft including the first sun gear, a second rotational shaft including the first planetary carrier, the second ring gear, the third sun gear, and the fourth sun gear, a third rotational shaft including the first ring gear, a fourth rotational shaft including the second sun gear, and selectively connected to the first rotational shaft and selectively connected to a transmission housing simultaneously, a fifth rotational shaft including the second planetary carrier, and selectively connected to the first rotational shaft and directly connected to the input shaft simultaneously, a sixth rotational shaft including the third planetary carrier and the fourth ring gear and selectively connected to the transmission housing, a seventh rotational shaft including the third ring gear and selectively connected to the first and third rotational shafts, an eighth rotational shaft including the fourth planetary carrier and directly connected to the output shaft, and six frictional elements configured between the rotational shafts and at portions that selectively connect the rotational shafts and the transmission housing to each other.

The first, second, third, and fourth planetary gear sets may be formed of a single pinion planetary gear set.

The first, second, third, and fourth planetary gear sets may be sequentially disposed from an engine side.

The first, second, third, and fourth planetary gear sets may be sequentially disposed from an engine side.

The six frictional elements may include a first clutch interposed between the first rotational shaft and the fifth rotational shaft, a second clutch interposed between the first rotational shaft and the fourth rotational shaft, a third clutch interposed between the first rotational shaft and the seventh rotational shaft, a fourth clutch interposed between the third rotational shaft and the seventh rotational shaft, a first brake interposed between the fourth rotational shaft and the transmission housing, and a second brake interposed between the sixth rotational shaft and the transmission housing.

Shift stages implemented by a selective operation of the six frictional elements may include a first advance shift stage implemented by a simultaneous operation of the first and fourth clutches and the second brake, a second advance shift stage implemented by a simultaneous operation of the second and fourth clutches and the second brake, a third advance shift stage implemented by a simultaneous operation of the first and second clutches and the second brake, a fourth advance shift stage implemented by a simultaneous operation of the second clutch and the first and second brakes, a fifth advance shift stage implemented by a simultaneous operation of the second and third clutches and the second brake, a sixth advance shift stage implemented by a simultaneous operation of the second and third clutches and the first brake, a seventh advance shift stage implemented by a simultaneous operation of the first, second, and third clutches, an eighth advance shift stage implemented by a simultaneous operation of the first and third clutches and the first brake, a ninth advance shift stage implemented by a simultaneous operation of the third and fourth clutches and the first brake, a tenth advance shift stage implemented by a simultaneous operation of the first and fourth clutches and the first brake, an eleventh advance shift stage implemented by a simultaneous operation of the second and fourth clutches and the first brake, and a reverse shift stage implemented by a simultaneous operation of the first and third clutches and the second brake.

According to various aspects of the present invention, a planetary gear train of an automatic transmission for vehicles may include an input shaft receiving power of an engine, an output shaft outputting shifted power of the engine, a first planetary gear set having a first sun gear, a first planetary carrier, and a first ring gear, a second planetary gear set having a second sun gear, a second planetary carrier, and a second ring gear, a third planetary gear set having a third sun gear, a third planetary carrier, and a third ring gear, a fourth planetary gear set having a fourth sun gear, a fourth planetary carrier, and a fourth ring gear, in which the input shaft may be directly connected to the second planetary carrier, the output shaft may be directly connected to the fourth planetary carrier, the first planetary carrier, the second ring gear, the third sun gear, and the fourth sun gear may be directly connected to each other, and the third planetary carrier and the fourth ring gear may be directly connected to each other, a first clutch selectively connecting the first sun gear and the second planetary carrier to each other, a second clutch selectively connecting the first sun gear and the second sun gear to each other, a third clutch selectively connecting the first sun gear and the third ring gear to each other, a fourth clutch selectively connecting the first ring gear and the third ring gear to each other, a first brake selectively connecting the second sun gear to the transmission housing, and a second brake selectively connecting the third planetary carrier and the fourth ring gear to the transmission housing.

Shift stages implemented by a selective operation of the first, second, third, and fourth clutches and the first and second brakes may include a first advance shift stage implemented by a simultaneous operation of the first and fourth clutches and the second brake, a second advance shift stage implemented by a simultaneous operation of the second and fourth clutches and the second brake, a third advance shift stage implemented by a simultaneous operation of the first and second clutches and the second brake, a fourth advance shift stage implemented by a simultaneous operation of the second clutch and the first and second brakes, a fifth advance shift stage implemented by a simultaneous operation of the second and third clutches and the second brake, a sixth advance shift stage implemented by a simultaneous operation of the second and third clutches and the first brake, a seventh advance shift stage implemented by a simultaneous operation of the first, second, and third clutches, an eighth advance shift stage implemented by a simultaneous operation of the first and third clutches and the first brake, a ninth advance shift stage implemented by a simultaneous operation of the third and fourth clutches and the first brake, a tenth advance shift stage implemented by a simultaneous operation of the first and fourth clutches and the first brake, an eleventh advance shift stage implemented by a simultaneous operation of the second and fourth clutches and the first brake, and a reverse shift stage implemented by a simultaneous operation of the first and third clutches and the second brake.

According to various embodiments of the present invention, the shift stage of advance 11-speed is implemented by combining four planetary gear sets formed of simple planetary gear sets with six frictional elements, thereby making it possible to improve power transfer performance and fuel costs.

In addition, since the shift stage suitable for the RPM of the engine may be implemented by the multiple stage of the automatic transmission, driving silence may be significantly improved.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 is an operation table for each shift stage of each frictional element which is used for the exemplary planetary gear train according to the present invention.

Figure 1:
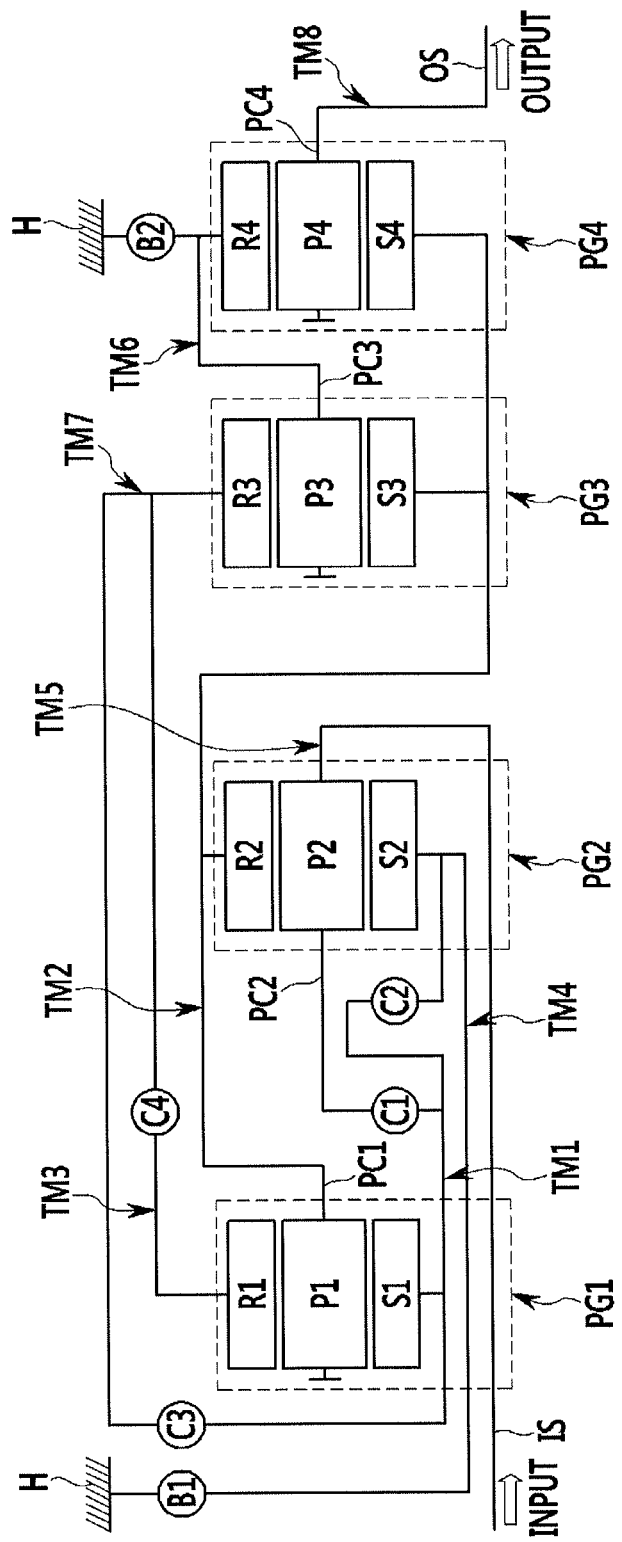
FIG. 1 is a configuration diagram of an exemplary planetary gear train according to the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

FIG. 1 is a configuration diagram of a planetary gear train according to various embodiments of the present invention.

Referring to FIG. 1, the planetary gear train according to various embodiments of the present invention includes first, second, third, and fourth planetary gear sets PG1, PG2, PG3, and PG4 disposed on the same shaft line, an input shaft IS, an output shaft OS, eight rotational shafts TM1 to TM8 that directly connect the respective rotational elements of the first, second, third, and fourth planetary gear sets PG1, PG2, PG3, and PG4 to each other, six frictional elements C1 to C4 and B1 to B2, and a transmission housing H.

Thus, rotation power input from the input shaft IS is shifted by a complementary operation of the first, second, third, and fourth planetary gear sets PG1, PG2, PG3, and PG4 and is output through the output shaft OS.

In addition, the respective simple planetary gear sets are disposed in the order of the first, second, third, and fourth planetary gear sets PG1, PG2, PG3, and PG4 from an engine side.

The input shaft IS is an input member, wherein rotation power from a crank shaft of the engine is converted into torque by a torque converter and is input to the input shaft IS.

The output shaft OS is an output member, and is disposed on the same shaft line as the input shaft to transfer shifted driving force to a driving shaft through a differential apparatus.

The first planetary gear set PG1, which is a single pinion planetary gear set, includes a first sun gear S1, a first planetary carrier PC1 supporting a first pinion P1 externally engaged with the first sun gear S1, and a first ring gear R1 internally engaged with the first pinion P1, as the rotational elements.

The second planetary gear set PG2, which is the single pinion planetary gear set, includes a second sun gear S2, a second planetary carrier PC2 supporting a second pinion P2 externally engaged with the second sun gear S2, and a second ring gear R2 internally engaged with the second pinion P2.

The third planetary gear set PG3, which is the single pinion planetary gear set, includes a third sun gear S3, a third planetary carrier PC3 supporting a third pinion P3 externally engaged with the third sun gear S3, and a third ring gear R3 internally engaged with the third pinion P3.

The fourth planetary gear set PG4, which is the single pinion planetary gear set, includes a fourth sun gear S4, a fourth planetary carrier PC4 supporting a fourth pinion P4 externally engaged with the fourth sun gear S4, and a fourth ring gear R4 internally engaged with the fourth pinion P4.

In addition, the first, second, third, and fourth planetary gear sets PG1, PG2, PG3, and PG4 have one or more rotational elements directly connected thereto, so as to be operated while having a total of eight rotational shafts TM1 to TM8.

A configuration of the eight rotational shafts TM1 to TM8 will be described.

The first rotational shaft TM1 is configured to include the first sun gear S1.

The second rotational shaft TM2 is configured to include the first planetary carrier PC1, the second ring gear R2, the third sun gear S3, and the fourth sun gear S4.

The third rotational shaft TM3 is configured to include the first ring gear R1.

The fourth rotational shaft TM4 is configured to include the second sun gear S2, and is selectively connected to the first rotational shaft TM1 and is selectively connected to the transmission housing H at the same time.

The fifth rotational shaft TM5 is configured to include the second planetary carrier PC2, and is selectively connected to the first rotational shaft TM1 and is directly connected to the input shaft IS at the same time, so as to be always operated as an input element.

The sixth rotational shaft TM6 is configured to include the third planetary carrier PC3 and the fourth ring gear R4, and is selectively connected to the transmission housing H.

The seventh rotational shaft TM7 is configured to include the third ring gear R3, and is selectively connected to the first and third rotational shafts TM1 and TM3.

The eighth rotational shaft TM8 is configured to include the fourth planetary carrier PC4, and is directly connected to the output shaft OS, so as to be always operated as an output element.

In addition, four clutches C1, C2, C3, and C4, which are frictional elements, are disposed at portions to which the rotational shafts are selectively connected to each other, among the rotational shafts TM1 to TM8.

In addition, two brakes B1 and B2, which are the frictional elements, are disposed at portions of the rotational shafts TM1 to TM8 which are selectively connected to the transmission housing H.

Disposed positions of the six frictional elements C1 to C4 and B1 to B2 will be described below.

The first clutch C1 is interposed between the first rotational shaft TM1 and the fifth rotational shaft TM5 to allow the first rotational shaft TM1 and the fifth rotational shaft TM5 to be selectively integrated with each other.

The second clutch C2 is interposed between the first rotational shaft TM1 and the fourth rotational shaft TM4 to allow the first rotational shaft TM1 and the fourth rotational shaft TM4 to be selectively integrated with each other.

The third clutch C3 is interposed between the first rotational shaft TM1 and the seventh rotational shaft TM7 to allow the first rotational shaft TM1 and the seventh rotational shaft TM7 to be selectively integrated with each other.

The fourth clutch C4 is interposed between the third rotational shaft TM3 and the seventh rotational shaft TM7 to allow the third rotational shaft TM3 and the seventh rotational shaft TM7 to be selectively integrated with each other.

The first brake B1 is interposed between the fourth rotational shaft TM4 and the transmission housing H to allow the fourth rotational shaft TM4 to be operated as a selective fixing element.

The second brake B2 is interposed between the sixth rotational shaft TM6 and the transmission housing H to allow the sixth rotational shaft TM6 to be operated as the selective fixing element.

The respective frictional elements including the first, second, third, and fourth clutches C1, C2, C3, and C4, and the first and second brakes B1 and B2 may be formed of a multi-plate type hydraulic friction coupling unit which is frictionally coupled by hydraulic pressure.

FIG. 2 is an operation table for each shift stage of each frictional element which is used for the planetary gear train according to various embodiments of the present invention.

As shown in FIG. 2, the planetary gear train according to various embodiments of the present invention is shifted while three frictional elements are operated in each shift stage.

An advance 1-speed shift stage (1ST) is implemented by a simultaneous operation of the first and fourth clutches C1 and C4, and the second brake B2.

An advance 2-speed shift stage (2ND) is implemented by a simultaneous operation of the second and fourth clutches C2 and C4, and the second brake B2.

An advance 3-speed shift stage (3RD) is implemented by a simultaneous operation of the first and second clutches C1 and C2, and the second brake B2.

An advance 4-speed shift stage (4TH) is implemented by a simultaneous operation of the second clutch C2 and the first and second brakes B1 and B2.

An advance 5-speed shift stage (5TH) is implemented by a simultaneous operation of the second and third clutches C2 and C3, and the second brake B2.

An advance 6-speed shift stage (6TH) is implemented by a simultaneous operation of the second and third clutches C2 and C3, and the first brake B1.

An advance 7-speed shift stage (7TH) is implemented by a simultaneous operation of the first, second and third clutches C1, C2, and C3.

An advance 8-speed shift stage (8TH) is implemented by a simultaneous operation of the first and third clutches C1 and C3, and the first brake B1.

An advance 9-speed shift stage (9TH) is implemented by a simultaneous operation of the third and fourth clutches C3 and C4, and the first brake B1.

An advance 10-speed shift stage (10TH) is implemented by a simultaneous operation of the first and fourth clutches C1 and C4, and the first brake B1.

An advance 11-speed shift stage (11TH) is implemented by a simultaneous operation of the second and fourth clutches C2 and C4, and the first brake B1.

A reverse shift stage (REV) is implemented by a simultaneous operation of the first and third clutches C1 and C3, and the second brake B2.

The shifting process will be described below in more detail.

In the advance 1-speed shift stage (1ST), when the first and fourth clutches C1 and C4, and the second brake B2 are simultaneously operated, in a state in which the first rotational shaft TM1 is connected to the fifth rotational shaft TM5 and the third rotational shaft TM3 is connected to the seventh rotational shaft TM7, an input to the fifth rotational shaft TM5 is performed and the sixth rotational shaft TM6 is operated as the fixing element, such that a shift of advance 1-speed is implemented.

In the advance 2-speed shift stage (2ND), when the second and fourth clutches C2 and C4, and the second brake B2 are simultaneously operated, in a state in which the first rotational shaft TM1 is connected to the fifth rotational shaft TM5 and the third rotational shaft TM3 is connected to the seventh rotational shaft TM7, the input to the fifth rotational shaft TM5 is performed and the sixth rotational shaft TM6 is operated as the fixing element, such that a shift of advance 2-speed is implemented.

In the advance 3-speed shift stage (3RD), when the first and second clutches C1 and C2, and the second brake B2 are simultaneously operated, in a state in which the first rotational shaft TM1 is connected to the fifth and fourth rotational shafts TM5 and TM4, the input to the fifth rotational shaft TM5 is performed and the sixth rotational shaft TM6 is operated as the fixing element, such that a shift of advance 3-speed is implemented.

In the advance 4-speed shift stage (4TH), when the second clutch C2, and the first and second brakes B1 and B2 are simultaneously operated, in a state in which the first rotational shaft TM1 is connected to the fourth rotational shaft TM4, the input to the fifth rotational shaft TM5 is performed and the first and sixth rotational shafts TM1 and TM6 are operated as the fixing element, such that a shift of advance 4-speed is implemented.

In the advance 5-speed shift stage (5TH), when the second and third clutches C2 and C3, and the second brake B2 are simultaneously operated, in a state in which the first rotational shaft TM1 is connected to the fourth and seventh rotational shafts TM4 and TM7, the input to the fifth rotational shaft TM5 is performed and the sixth rotational shaft TM6 is operated as the fixing element, such that a shift of advance 5-speed is implemented.

In the advance 6-speed shift stage (6TH), when the second and third clutches C2 and C3, and the first brake B1 are simultaneously operated, in a state in which the first rotational shaft TM1 is connected to the fourth and seventh rotational shafts TM4 and TM7, the input to the fifth rotational shaft TM5 is performed and the first rotational shaft TM1 is operated as the fixing element, such that a shift of advance 6-speed is implemented.

In the advance 7-speed shift stage (7TH), when the first, second, and third clutches C1, C2, and C3 are simultaneously operated, in a state in which the first rotational shaft TM1 is connected to the fifth, fourth, and seventh rotational shafts TM5, TM4, and TM7, the input to the fifth rotational shaft TM5 is performed, such that a state in which all components mentioned above are directly connected to each other is implemented, thereby implementing a shift of advance 7-speed outputting the input as it is.

In the advance 8-speed shift stage (8TH), when the first and third clutches C1 and C3, and the first brake B1 are simultaneously operated, in a state in which the first rotational shaft TM1 is connected to the fifth and seventh rotational shafts TM5 and TM7, the input to the fifth rotational shaft TM5 is performed and the first rotational shaft TM1 is operated as the fixing element, such that a shift of advance 8-speed is implemented.

In the advance 9-speed shift stage (9TH), when the third and fourth clutches C3 and C4, and the first brake B1 are simultaneously operated, in a state in which the first rotational shaft TM1 is connected to the seventh rotational shaft TM7 and the third rotational shaft TM3 is connected to the seventh rotational shaft TM7, the input to the fifth rotational shaft TM5 is performed and the first rotational shaft TM1 is operated as the fixing element, such that a shift of advance 9-speed is implemented.

In the advance 10-speed shift stage (10TH), when the first and fourth clutches C1 and C4, and the first brake B1 are simultaneously operated, in a state in which the first rotational shaft TM1 is connected to the fifth rotational shaft TM5 and the third rotational shaft TM3 is connected to the seventh rotational shaft TM7, the input to the fifth rotational shaft TM5 is performed and the first rotational shaft TM1 is operated as the fixing element, such that a shift of advance 10-speed is implemented.

In the advance 11-speed shift stage (11TH), when the second and fourth clutches C2 and C4, and the first brake B1 are simultaneously operated, in a state in which the first rotational shaft TM1 is connected to the fourth rotational shaft TM4 and the third rotational shaft TM3 is connected to the seventh rotational shaft TM7, the input to the fifth rotational shaft TM5 is performed and the first rotational shaft TM1 is operated as the fixing element, such that a shift of advance 11-speed is implemented.

In the reverse shift stage (REV), when the first and third clutches C1 and C3, and the second brake B2 are simultaneously operated, in a state in which the first rotational shaft TM1 is connected to the fifth and seventh rotational shafts TM5 and TM7, the input to the fifth rotational shaft TM5 is performed and the sixth rotational shaft TM6 is operated as the fixing element, such that a reverse shift is implemented.

As described above, the planetary gear train according to various embodiments of the present invention may implement a shift stage of advance 11-speed and reverse 1-speed with the fourth planetary gear sets PG1, PG2, PG3, and PG4 by the operation control of the fourth clutches C1, C2, C3, and C4, and the two brakes B1 and B2.

As a result, the planetary gear train according to various embodiments of the present invention may improve power transfer efficiency and fuel efficiency by a multi-stage of the automatic transmission.

In addition, since the shift stage suitable for the RPM of the engine may be implemented by the multi-stage of the automatic transmission, driving silence may be significantly improved.

In addition, since the three frictional elements are operated for each shift stage, the number of frictional elements which are not operated is minimized to reduce friction drag loss, thereby making it possible to improve the power transfer efficiency and the fuel efficiency.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A planetary gear train of an automatic transmission for vehicles, the planetary gear train comprising:
    an input shaft receiving power of an engine;
    an output shaft outputting shifted power of the engine;
    a first planetary gear set having a first sun gear, a first planetary carrier, and a first ring gear;
    a second planetary gear set having a second sun gear, a second planetary carrier, and a second ring gear;
    a third planetary gear set having a third sun gear, a third planetary carrier, and a third ring gear;
    a fourth planetary gear set having a fourth sun gear, a fourth planetary carrier, and a fourth ring gear;
    a first rotational shaft including the first sun gear;
    a second rotational shaft including the first planetary carrier, the second ring gear, the third sun gear, and the fourth sun gear;
    a third rotational shaft including the first ring gear;
    a fourth rotational shaft including the second sun gear, and selectively connected to the first rotational shaft and selectively connected to a transmission housing simultaneously;
    a fifth rotational shaft including the second planetary carrier, and selectively connected to the first rotational shaft and directly connected to the input shaft simultaneously;
    a sixth rotational shaft including the third planetary carrier and the fourth ring gear and selectively connected to the transmission housing;
    a seventh rotational shaft including the third ring gear and selectively connected to the first and third rotational shafts;
    an eighth rotational shaft including the fourth planetary carrier and directly connected to the output shaft; and
    six frictional elements configured between the rotational shafts and at portions that selectively connect the rotational shafts and the transmission housing to each other.

2. The planetary gear train of the automatic transmission for vehicles of claim 1, wherein the first, second, third, and fourth planetary gear sets are formed of a single pinion planetary gear set.

3. The planetary gear train of the automatic transmission for vehicles of claim 1, wherein the first, second, third, and fourth planetary gear sets are sequentially disposed from an engine side.

4. The planetary gear train of the automatic transmission for vehicles of claim 2, wherein the first, second, third, and fourth planetary gear sets are sequentially disposed from an engine side.

5. The planetary gear train of the automatic transmission for vehicles of claim 1, wherein the six frictional elements include:
    a first clutch interposed between the first rotational shaft and the fifth rotational shaft;
    a second clutch interposed between the first rotational shaft and the fourth rotational shaft;
    a third clutch interposed between the first rotational shaft and the seventh rotational shaft;
    a fourth clutch interposed between the third rotational shaft and the seventh rotational shaft;
    a first brake interposed between the fourth rotational shaft and the transmission housing; and
    a second brake interposed between the sixth rotational shaft and the transmission housing.

6. The planetary gear train of the automatic transmission for vehicles of claim 5, wherein shift stages implemented by a selective operation of the six frictional elements include:
    a first advance shift stage implemented by a simultaneous operation of the first and fourth clutches and the second brake;
    a second advance shift stage implemented by a simultaneous operation of the second and fourth clutches and the second brake;
    a third advance shift stage implemented by a simultaneous operation of the first and second clutches and the second brake;
    a fourth advance shift stage implemented by a simultaneous operation of the second clutch and the first and second brakes;
    a fifth advance shift stage implemented by a simultaneous operation of the second and third clutches and the second brake;
    a sixth advance shift stage implemented by a simultaneous operation of the second and third clutches and the first brake;
    a seventh advance shift stage implemented by a simultaneous operation of the first, second, and third clutches;
    an eighth advance shift stage implemented by a simultaneous operation of the first and third clutches and the first brake;
    a ninth advance shift stage implemented by a simultaneous operation of the third and fourth clutches and the first brake;
    a tenth advance shift stage implemented by a simultaneous operation of the first and fourth clutches and the first brake;
    an eleventh advance shift stage implemented by a simultaneous operation of the second and fourth clutches and the first brake; and
    a reverse shift stage implemented by a simultaneous operation of the first and third clutches and the second brake.

7. A planetary gear train of an automatic transmission for vehicles, the planetary gear train comprising:
    an input shaft receiving power of an engine;
    an output shaft outputting shifted power of the engine;
    a first planetary gear set having a first sun gear, a first planetary carrier, and a first ring gear;

a second planetary gear set having a second sun gear, a second planetary carrier, and a second ring gear;

a third planetary gear set having a third sun gear, a third planetary carrier, and a third ring gear;

a fourth planetary gear set having a fourth sun gear, a fourth planetary carrier, and a fourth ring gear, wherein the input shaft is directly connected to the second planetary carrier, the output shaft is directly connected to the fourth planetary carrier, the first planetary carrier, the second ring gear, the third sun gear, and the fourth sun gear are directly connected to each other, and the third planetary carrier and the fourth ring gear are directly connected to each other;

a first clutch selectively connecting the first sun gear and the second planetary carrier to each other;

a second clutch selectively connecting the first sun gear and the second sun gear to each other;

a third clutch selectively connecting the first sun gear and the third ring gear to each other;

a fourth clutch selectively connecting the first ring gear and the third ring gear to each other;

a first brake selectively connecting the second sun gear to the transmission housing; and a second brake selectively connecting the third planetary carrier and the fourth ring gear to the transmission housing.

8. The planetary gear train of the automatic transmission for vehicles of claim 7, wherein the first, second, third, and fourth planetary gear sets are each formed of a single pinion planetary gear set.

9. The planetary gear train of the automatic transmission for vehicles of claim 7, wherein the first, second, third, and fourth planetary gear sets are sequentially disposed from an engine side.

10. The planetary gear train of the automatic transmission for vehicles of claim 8, wherein the first, second, third, and fourth planetary gear sets are sequentially disposed from an engine side.

11. The planetary gear train of the automatic transmission for vehicles of claim 8, wherein shift stages implemented by a selective operation of the first, second, third, and fourth clutches and the first and second brakes include:

a first advance shift stage implemented by a simultaneous operation of the first and fourth clutches and the second brake;

a second advance shift stage implemented by a simultaneous operation of the second and fourth clutches and the second brake;

a third advance shift stage implemented by a simultaneous operation of the first and second clutches and the second brake;

a fourth advance shift stage implemented by a simultaneous operation of the second clutch and the first and second brakes;

a fifth advance shift stage implemented by a simultaneous operation of the second and third clutches and the second brake;

a sixth advance shift stage implemented by a simultaneous operation of the second and third clutches and the first brake;

a seventh advance shift stage implemented by a simultaneous operation of the first, second, and third clutches;

an eighth advance shift stage implemented by a simultaneous operation of the first and third clutches and the first brake;

a ninth advance shift stage implemented by a simultaneous operation of the third and fourth clutches and the first brake;

a tenth advance shift stage implemented by a simultaneous operation of the first and fourth clutches and the first brake;

an eleventh advance shift stage implemented by a simultaneous operation of the second and fourth clutches and the first brake; and a reverse shift stage implemented by a simultaneous operation of the first and third clutches and the second brake.

* * * * *